United States Patent
Awada et al.

(10) Patent No.: US 12,550,013 B2
(45) Date of Patent: Feb. 10, 2026

(54) INTER SECONDARY NODE CONDITIONAL PSCell CHANGE

(71) Applicant: Nokia Technologies Oy, Espoo (FI)

(72) Inventors: Ahmad Awada, Munich (DE); Krzysztof Kordybach, Wroclaw (PL); Srinivasan Selvaganapathy, Bangalore (IN); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 533 days.

(21) Appl. No.: 18/033,392

(22) PCT Filed: Oct. 14, 2021

(86) PCT No.: PCT/EP2021/078496
§ 371 (c)(1),
(2) Date: Apr. 24, 2023

(87) PCT Pub. No.: WO2022/084153
PCT Pub. Date: Apr. 28, 2022

(65) Prior Publication Data
US 2023/0422108 A1    Dec. 28, 2023

(30) Foreign Application Priority Data
Oct. 22, 2020   (IN) .............................. 202041046092

(51) Int. Cl.
*H04W 36/00* (2009.01)
*H04W 36/36* (2009.01)

(52) U.S. Cl.
CPC ... *H04W 36/0058* (2018.08); *H04W 36/0016* (2013.01); *H04W 36/00698* (2023.05); *H04W 36/362* (2023.05)

(58) Field of Classification Search
CPC ......... H04W 36/0058; H04W 36/0016; H04W 36/00698; H04W 36/362; H04W 36/0027; H04W 36/0061; H04W 36/0088
See application file for complete search history.

(56) References Cited

U.S. PATENT DOCUMENTS 11,582,651 B2 *   2/2023   Chen ............... H04W 36/00698
11,792,696 B2 *  10/2023   Futaki .................. H04W 36/36
                                                                370/331
(Continued)

FOREIGN PATENT DOCUMENTS

EP        4122281 B1 * 10/2025 .......... H04W 36/362
WO    WO 2021/201758 A1   10/2021

OTHER PUBLICATIONS

Qualcomm Incorporated, "Conditional PSCell addition/change," 3GPP TSG-RAN WG2 Meeting #111-e, R2-2007749, Aug. 17-28, 2020.

(Continued)

*Primary Examiner* — Mounir Moutaouakil
(74) *Attorney, Agent, or Firm* — McCarter & English LLP

(57) ABSTRACT

This disclosure presents processes to allow a conditional reconfiguration of a conditional cell change operation between a user equipment (UE) and one or more of a master node (MN), a source secondary node (SN), or a target SN. In some aspects, a SN/SgNB change required message can include a measurement ID for target PSCells, a dedicated measurement ID for each target PSCell, a set of measurement IDs, or a list of target PSCells, where the data can be prepared by the target SN, or an indication for the MN to inform the source SN about a list of prepared target PSCells or a default measurement ID. In some aspects, the respective of a RRCReconfiguration or a RRCConnectionReconfiguration message can include the measurement ID, the set of (Continued)

measurement IDs, or the default measurement ID to inform the UE on the configurations for the cell change operation.

8 Claims, 6 Drawing Sheets

(56) References Cited

U.S. PATENT DOCUMENTS

| | | | |
|---|---|---|---|
| 11,800,418 B2* | 10/2023 | Paladugu | H04W 36/322 |
| 2018/0279193 A1* | 9/2018 | Park | H04W 36/26 |
| 2019/0254101 A1* | 8/2019 | Lee | H04W 76/22 |
| 2020/0229054 A1* | 7/2020 | Lee | H04W 36/00837 |
| 2022/0038968 A1* | 2/2022 | Latheef | H04W 24/10 |
| 2022/0141904 A1* | 5/2022 | Yilmaz | H04W 76/27 |
| | | | 370/329 |
| 2022/0217597 A1* | 7/2022 | Ishii | H04W 76/20 |

OTHER PUBLICATIONS

CATT (Rapporteur), "Report on Email Discussion [107b#52][NR MobE] Open Issues Conditional PSCell Addition/Change (CATT)," 3GPP TSG-RAN WG2 Meeting #108, R2-1915962, Nov. 18-22, 2019, Reno, USA.

CATT, "Draft stage-2 CR for Conditional PSCell Addition/Change," 3GPP TSG-RAN2 Meeting #108, R2-1915985, Nov. 18-22, 2019, Reno, USA.

Ericsson, "Conditional PSCell Change/Addition," 3GPP TSG-RAN WG2 #113e, R2-2101270, Jan. 25-Feb. 5, 2021.

* cited by examiner

INTER SECONDARY NODE CONDITIONAL PSCell CHANGE

CROSS REFERENCE TO RELATED APPLICATION

This patent application is a U.S. National Stage application of International Patent Application Number PCT/EP2021/078496 filed Oct. 14, 2021, which is hereby incorporated by reference in its entirety, and claims priority to IN 202041046092 filed Oct. 22, 2020.

TECHNICAL FIELD

This application is directed, in general, to a 5G conditional cell change for mobile devices and, more specifically, to generating a conditional reconfiguration message.

BACKGROUND

In a 5G communication environment, a user equipment (UE) can be requested to perform a conditional cell change operation transferring the communication connection from a source network device to a target network device, such as a 5G base station (gNB) or an E-UTRA enhanced 4G eNodeB base station (eNB). The UE could be moving and the target network device would be better suited to handle the communications going forward, there could be load balancing between the source network device and the target network device, or the UE could be located close to a midpoint between the source network device and the target network device. Transferring from the source network device to the target network device may utilize a 5G conditional cell change protocol. In a 5G environment, several conditional cell changes can be configured. At a time the cell change should be executed, conditions may change warranting a change in the conditional configuration to improve efficiency. A process to implement the conditional cell change while allowing for conditional reconfigurations of the cell change operation would be beneficial.

SUMMARY

In one aspect, a method is disclosed. In one example embodiment, the method includes: (1) initiating a SN/SgNB Change Required message by a source secondary node (SN) wherein the SN/SgNB Change Required message includes a measurement identification (ID) for one or more prepared target primary secondary cells (PSCells), (2) communicating a SN/SgNB Addition Request message from a master node (MN), as a response to the SN/SgNB Change Required message received from the source SN, (3) transmitting a SN/SgNB Addition Request Acknowledge message from a target SN as a response to the SN/SgNB Addition Request message received from the MN, wherein the target SN determines the one or more prepared target PSCells, and (4) generating a conditional reconfiguration message at the MN and communicating the conditional reconfiguration message to a user equipment (UE), wherein the MN utilizes the SN/SgNB Addition Request Acknowledge message received from the target SN and the measurement ID.

In a second aspect, a system is disclosed. In one example embodiment, the system includes: (1) a UE, operable to transceive communications with one or more communication nodes, wherein the UE supports conditional cell change operations and receives a conditional reconfiguration message, (2) a MN, operable to transceive communications with the UE, (3) a source SN, operable to transceive communications with the MN, and (4) a target SN, operable to transceive communications with the MN and the source SN, wherein the source SN is operable to communicate a SN/SgNB Change Required message that includes one or more measurement IDs corresponding to a prepared target PSCell.

In a third aspect, an apparatus is disclosed. In one example embodiment, the apparatus includes: (1) a UE, operable to communicate with a MN and of initiating a cell change operation, and (2) a source SN, operable to communicate with the MN and a target MN, and to initiate a SN/SgNB Change Required message to determine a set of cell change parameters in support of the cell change operation, wherein the SN/SgNB Change Required message includes one or more of a single measurement ID, a set of measurement IDs, a default measurement ID, or an indication for the MN to inform the source SN about a list of prepared target PSCells, and where the MN is further operable to generate a conditional reconfiguration message using the set of cell change parameters and communicating the conditional reconfiguration message to the UE, where one or more of the single measurement ID or the set of measurement IDs correspond to one or more prepared target PSCells as received from the target SN.

In a fourth aspect, a method for configuring a conditional cell change operation at a UE for a MN, a source SN, and a target SN, where the MN is one of a first 5G base station (gNB), a first enhanced Node B (eNB), a first enhanced gNB (en-gNB), or a first next generation eNB (ng-eNB), the source SN is one of a second gNB, a second eNB, a second en-gNB, or a second ng-eNB, and the target SN is one of a third gNB, a third eNB, a third en-gNB, or a third ng-eNB is disclosed. In one example embodiment, the method includes: (1) including one or more of a set of measurement IDs or target PSCell to be prepared by the target SN in a SN/SgNB change required message sent from the source SN, (2) communicating an addition request message and an addition request acknowledge message as response to receiving the SN/SgNB change required message sent from the source SN, (3) generating a conditional reconfiguration message in response to one or more of the addition request acknowledge message, the measurement IDs, a default measurement ID, or the prepared target PSCell configurations, and (4) transmitting the conditional reconfiguration message to the UE.

BRIEF DESCRIPTION

Reference is now made to the following descriptions taken in conjunction with the accompanying drawings, in which.

DETAILED DESCRIPTION

Figure 1:
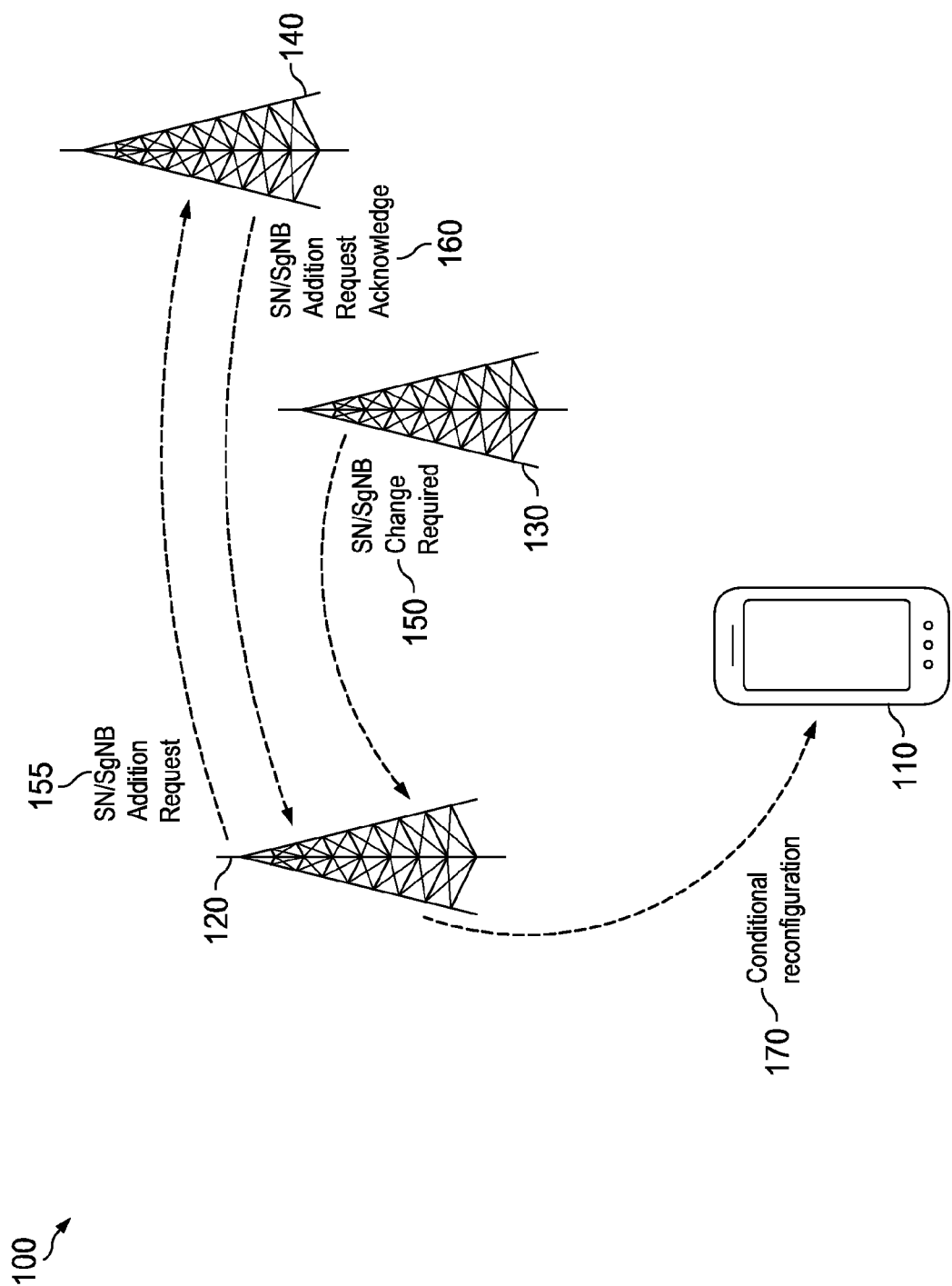
FIG. 1 is an illustration of a diagram of an example communication scenario with a user equipment (UE) and various communication nodes.

Within 5G 3GPP Release 16 standard (3GPP), conditional handover (HO) (CHO) operations were enabled. CHO is a process to allow a source node to define one or more execution conditions for a HO. The HO, or cell change for primary secondary cells (PSCells), can be executed autonomously by a user equipment (UE) when the condition expires. To improve cell change success, the source node can configure several, such as up to eight, target cells that can be ready to admit the UE once it attempts to access one of the target cells.

The specific standard referenced for this disclosure is 3GPP TS 37.340 and TS 36.423/38.423, and is incorporated herein. UE, such as mobile phones, tablets, laptops, and other 5G devices whether movable, mobile, or stationary, can establish a communication link with one or more network devices, for example, a 5G base station (gNB) or an evolved universal mobile telecommunications system (UNITS) terrestrial radio access (E-UTRA) or enhanced 4G eNodeB E-UTRA base station (eNB). For purposes of this disclosure, network devices can be referred herein as gNB and shall include eNB. The communications between the UE and the network device can be transferred, e.g., following the cell change, to another network device for various reasons, for example, as the UE is moving the second network device may be able to provide a higher quality communication link or when communication load balancing is being performed between the network devices.

Since cell changes are distributed in time domain, the radio or load situation can change, e.g., the UE accesses the target cell when the configured condition expires which can be a time interval later than the reception of the reconfiguration message. Therefore, the source node can modify already prepared cell change parameter while the UE remains connected to the source node. The cell change execution condition can be identified by a measurement identification (ID) and can be associated with a conditional reconfiguration of a target cell, for example, applied when the cell change execution condition is satisfied.

A similar solution can be enabled for the secondary node (SN) addition and SN change, such as with dual connectivity operations. In 3GPP Rel. 16, intra-SN conditional PSCell change (CPC) without master node (MN) involvement is enabled. It would be beneficial to enable other aspects, such as SN CPC with MN involvement including inter-SN changes, and conditional PSCell addition (CPA).

CPC can have at least two approaches MN-initiated CPC and SN-initiated CPC. The approaches can share part of the procedure with CPA which are the SN addition steps towards the target SN. At the beginning of this common procedure, the MN initiates the SN addition preparation procedure towards the target SN. Three options have been reviewed on how the conditional reconfiguration, including the cell change parameters, for SN initiated inter-SN conditional PSCell change can be generated. The conditional reconfiguration can be signaled as the RRCConnectionReconfiguration message for eNB devices and RRCReconfiguration message for gNB devices.

Option 1: The MN generates the CPC. The source SN can set the execution condition and communicate it to the MN. The MN can generate the conditional reconfiguration message including the one or more execution conditions provided by the source SN and the conditional reconfiguration message provided by the one or more candidate PSCells.

Option 2: The target SN can generate CPC. The source SN sets the execution condition and communicates it to the target SN. The target SN generates the conditional configuration message. The target SN generated conditional configuration message can be provided to the MN for transmission to the UE. In some aspects, the transmission can be in a transparent container.

Option 3: The source SN can generate the CPC. The source SN sets the execution condition. The source SN communicates with the target SN and receives the conditional reconfiguration message provided by the one or more candidate PSCells. The source SN can generate the conditional reconfiguration message and provide it to the MN for transmission to the UE. In some aspects, the transmission can be in a transparent container.

Following the MR-DC principles of release 15, in SN-initiated inter-SN change, source SN can indicate to the MN the ID of the target SN which is in turn free to select the target PSCells. For example, in option 1 above, the source SN can set the execution condition associated with each target PSCell. These target PSCells are unknown to the source SN as the decision is left for the target SN.

This disclosure addresses how the source SN can set the CPC execution condition for the target PSCells if the source SN does not know which target PSCells the target SN would decide on and prepare for. The disclosure presents three aspects that can be used to resolve how the source SN can set the CPC execution condition for the target PSCells.

In some aspects, the source SN can provide in the SN/SgNB Change Required message to the MN, a single measurement ID that can be used as a CPC execution condition for the conditional reconfigurations of the one or more target PSCells that are prepared by a target SN. SN, of the SN/SgNB, protocol is used in Multi-Radio Dual Connectivity (MR-DC) with 5G Core (5GC). SgNB, of the SN/SgNB, protocol is used in E-UTRAN-NR Dual Connectivity (EN-DC). When generating the conditional reconfiguration to the UE, the MN can set the same CPC execution condition for the prepared PSCells in the same target SN.

In some aspects, the source SN can provide to the MN, for example, using the SN/SgNB Change Required message, a list of prepared target PSCells that can be selected and prepared by the target SN. After receiving a SN/SgNB Addition Request Acknowledge message from the target SN, including the prepared PSCells, the MN can provide the source SN the list of prepared PSCells and the SN can provide in return the list of measurement IDs and their association with different target PSCells. For example, the source SN can provide a measurement ID that is associated with each prepared target PSCell. Using this information, the MN can generate the conditional reconfiguration message by providing a dedicated CPC execution condition, such as identified by the measurement ID, for each prepared target PSCell.

In some aspects, the source SN can provide in a SgNB Change Required message a list of target PSCells to be prepared by the target SN. The MN can then provide the list of target PSCells, suggested by the source SN, to be prepared to the target SN. Following that, the target SN can determine the list of target PSCells that are prepared, which can be a subset of the list indicated by source SN, and indicate its decision to the MN.

In some aspects, the source SN can indicate to the MN, such as using the SgNB Change Required message, to inform the list of prepared target PSCells that are determined and prepared by the target SN. After receiving the SgNB Addition Request Acknowledge message from the target SN, including the prepared PSCells, the MN can inform the source SN about the list of prepared PSCells and the SN can provide in return the list of measurement IDs and their association, e.g., correspondence, with different target PSCells. The source SN can provide a measurement ID that is corresponding to each prepared target PSCell. Using this information, the MN can generate the conditional reconfiguration message by providing a dedicated CPC execution condition, identified by the measurement ID, for each of the prepared target PSCells.

In some aspects, the source SN can provide the MN, such as using a SN/SgNB Change Required message, a list of measurement IDs with their mapping to each of the potential target PSCells that the target SN can select and prepare. Along with this list, the source SN can provide a default measurement ID to be used for the other target PSCells that can be prepared by the target SN. When receiving the list of actually prepared PSCells, such as in a SN/SgNB Addition Request Acknowledge message received from the target SN, the MN selects the corresponding measurement IDs from the given list of measurement IDs and default measurement ID received previously from the source SN and can generate the conditional reconfiguration to the UE.

An example, for demonstration purposes, of the messaging changes to the 3GPP standard are shown in Table 1. Other messaging changes and different messaging changes can be utilized to implement this disclosure; Table 1 is for example.

TABLE 1

Example messaging to support conditional reconfiguration of a conditional cell change

| Message | Change |
| --- | --- |
| Message: SN/SgNB Change Required | Add field for a single measurement ID, identifying a CPC execution condition, to be applied for the target PSCells that are prepared by a target SN<br>Add field for an indication that MN shall inform the source SN about the list of target PSCells that are selected and prepared by the target SN<br>Add field array for a set of target PSCells that can be selected and prepared by the target SN<br>Add field array for a set of measurement IDs that apply for a list of prepared target PSCells that can be selected and prepared by the target SN<br>Add field for a default measurement ID that applies for a prepared target PSCell that does not have a dedicated measurement ID that is set by source SN |
| Message: SN/SgNB Addition Request Acknowledge | Add field array for a set of prepared target PSCells |
| New Message: CPC Execution Condition Request | Add field array for a set of prepared target PSCells corresponding to a set of target SNs |
| New Message: CPC Execution Condition Response | Add a field array for a set of measurement IDs corresponding to a set of prepared target PSCells |

Turning now to the figures, FIG. 1 is an illustration of a diagram of an example communication scenario 100 with a UE and various communication nodes. Communication scenario 100 is a demonstration of one type of environment for this disclosure. The environment for communication scenario 100 includes a UE 110, a MN 120, a source SN 130, and a target SN 140.

An example set of messages are shown in communication scenario 100 according to the 3GPP standard. A SN/SgNB Change Required message 150, which can contain a target SN ID, is sent from source SN 130 to MN 120. After SN/SgNB Change Required message 150, a SN/SgNB Addition Request message 155 is sent from MN 120 to target SN 140. Target SN 140 determines one or more PSCells, followed by target SN 140 communicating a SN/SgNB Addition Request Acknowledge message 160 to MN 120. Next, MN 120 communicates a conditional reconfiguration message 170 to UE 110.

Figure 2:
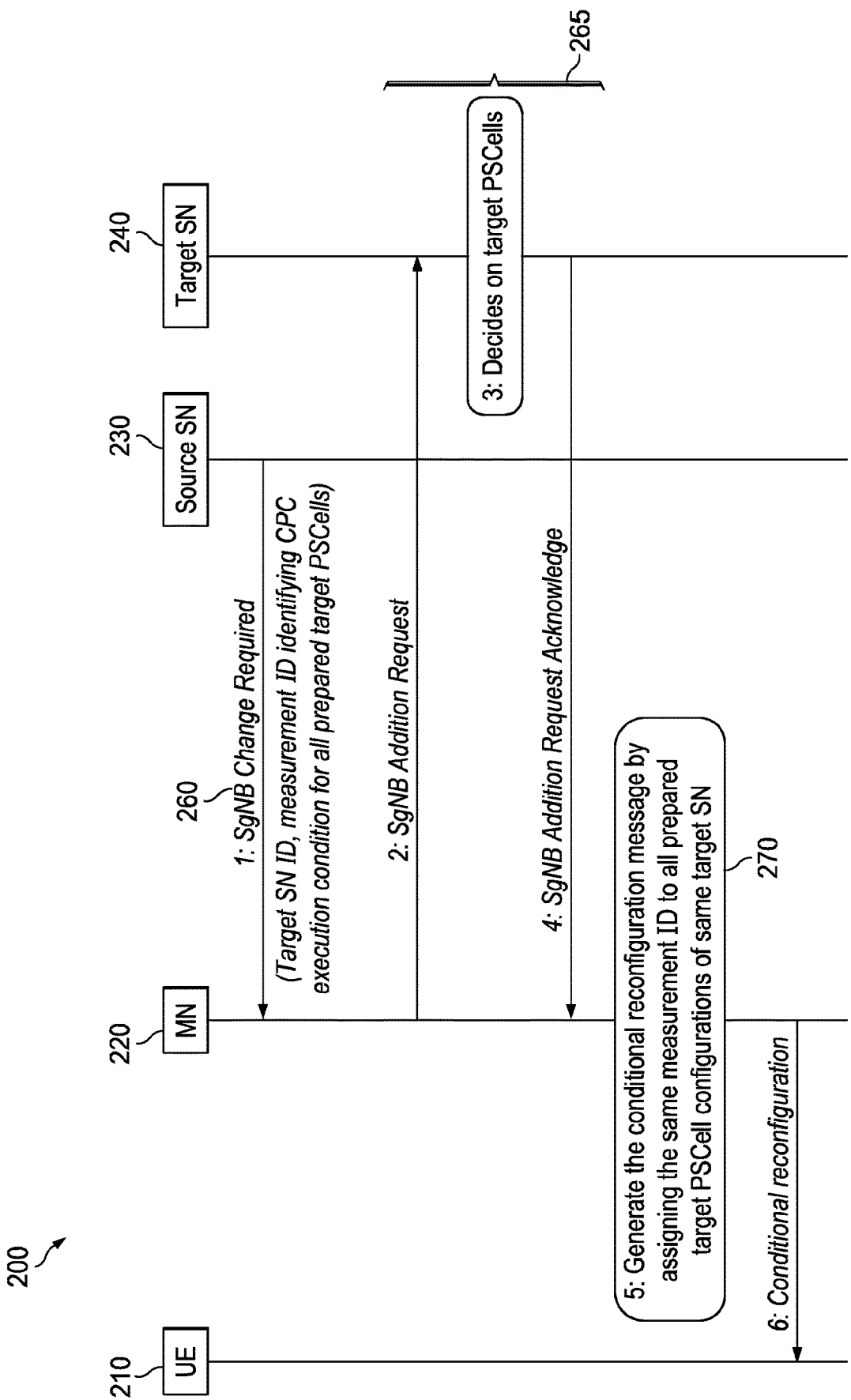
FIG. 2 is an illustration of a diagram of an example signal flow for SgNB Change Required message with a single conditional primary secondary cell (PS Cell) change (CPC) execution condition.

FIG. 2 is an illustration of a diagram of an example signal flow 200 for SgNB Change Required message with a single CPC execution condition, identified by a measurement ID for the prepared target PSCells. Signal flow 200 demonstrates one aspect of the disclosure to generate the conditional reconfiguration message. Signal flow 200 has an UE 210, a MN 220, a source SN 230, and a target SN 240.

In a signal step 260, source SN 230 initiates the process and provides MN 220 with the common measurement ID, i.e. CPC execution condition, for one or more prepared target PSCells. Signal steps 265, shown as steps 2, 3, and 4, are performed as per the 3GPP standard. When step 4 is accepted, e.g., the SN/SgNB Addition Request is accepted, MN 220 generates the conditional reconfiguration message for the prepared target PSCells of the same target SN using the same measurement ID, shown as signal step 270. The conditional reconfiguration is transmitted, e.g., communicated or sent, to UE 210 in standard step 6.

Figure 3:
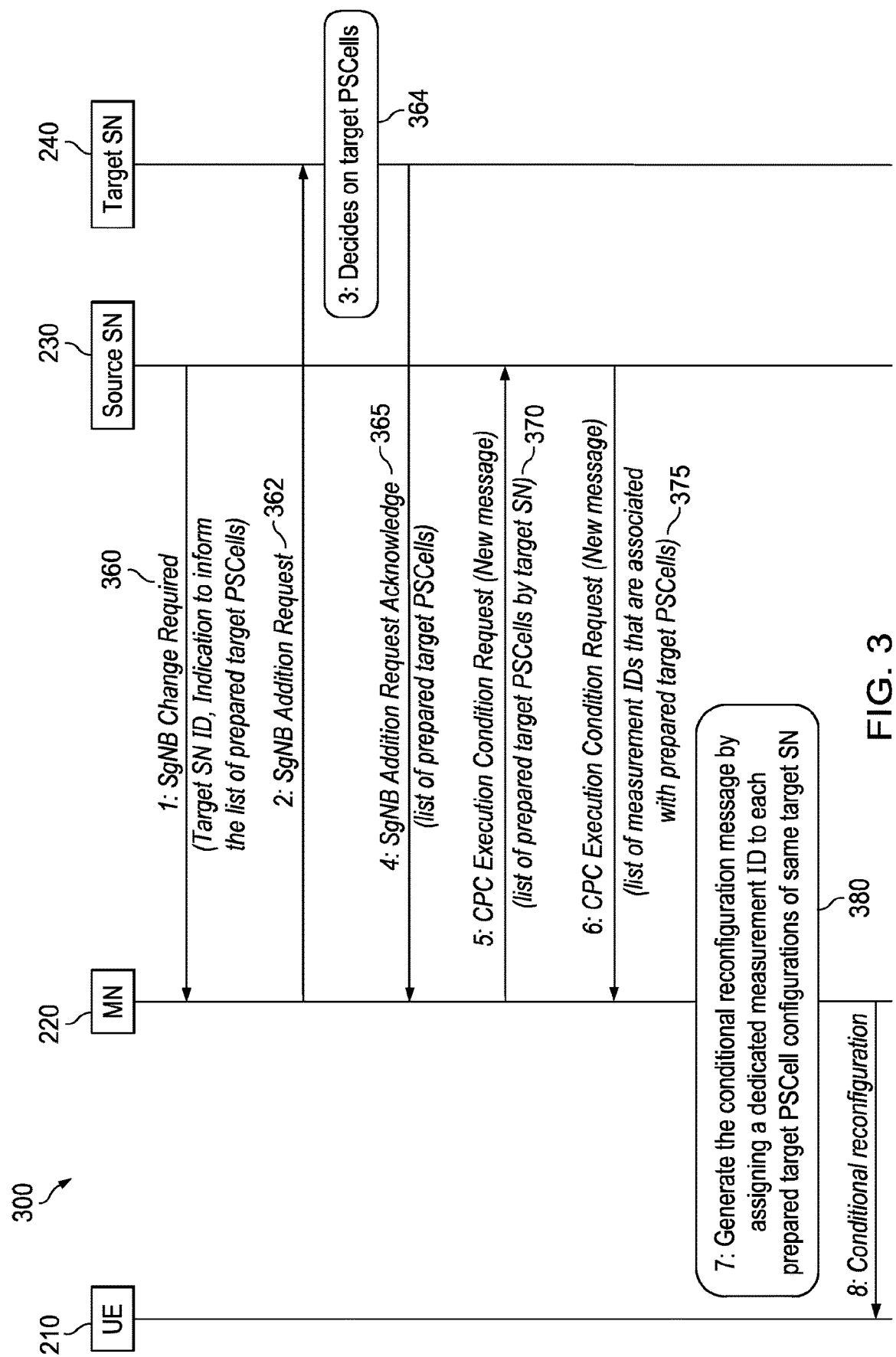
FIG. 3 is an illustration of a diagram of an example signal flow for SgNB Change Required message with an indication to a master node (MN) to inform source SN about the list of target primary secondary cell (PSCells) that are prepared by target SN.

FIG. 3 is an illustration of a diagram of an example signal flow 300 for SN/SgNB Change Required messages with an indication to a MN to inform a source SN about the list of target PSCells that are prepared by the target SN. Signal flow 300 uses the same operators as described in signal flow 200 of FIG. 2 with differing messaging to demonstrate additional aspects of the disclosure to generate the conditional reconfiguration message.

In some aspects, in a signal step 360 source SN 230 initiates the process and provides MN 220 an indication to inform the source SN about the one or more target PSCells that will be selected and determined by target SN 240, including a target SN ID. In a signal step 362, MN contacts target SN 240 and asks to prepare target PSCells per 3GPP standards. Target SN 240 responds, through a signal step 365, with a list of prepared target PSCells that were determined in a signal step 364. Next, in a signal flow 370, MN 220 can inform source SN 230 which target PSCells that have been selected and prepared by target SN 240. In a signal step 375, source SN 230 adds one or more CPC execution conditions, for example, measurement IDs, and communicates the CPC execution conditions back to MN 220. In a signal step 380, MN 220 generates a final conditional reconfiguration message to be provided to UE using 3GPP standard step 8.

In some aspects, signal step 360 can provide a list of target PSCells to be prepared, or suggested to be prepared, by target SN 240. In signal step 362, MN 220 provides the list of target PSCells, suggested by source SN 230, to be prepared by target SN 240. In signal step 364, target SN 240 determines the list of target PSCells that are prepared, which can be a subset of the list indicated by source SN 230, and indicate the determination to MN 220 as shown in signal step 365. Signal step 370, signal step 375, signal step 380, and 3GPP standard step 8 remain as described above.

In some aspects, the information elements (IEs) carried out by signal step 370 and signal step 375 can be provided using one of the existing 3GPP standard signaling messages.

Figure 4:
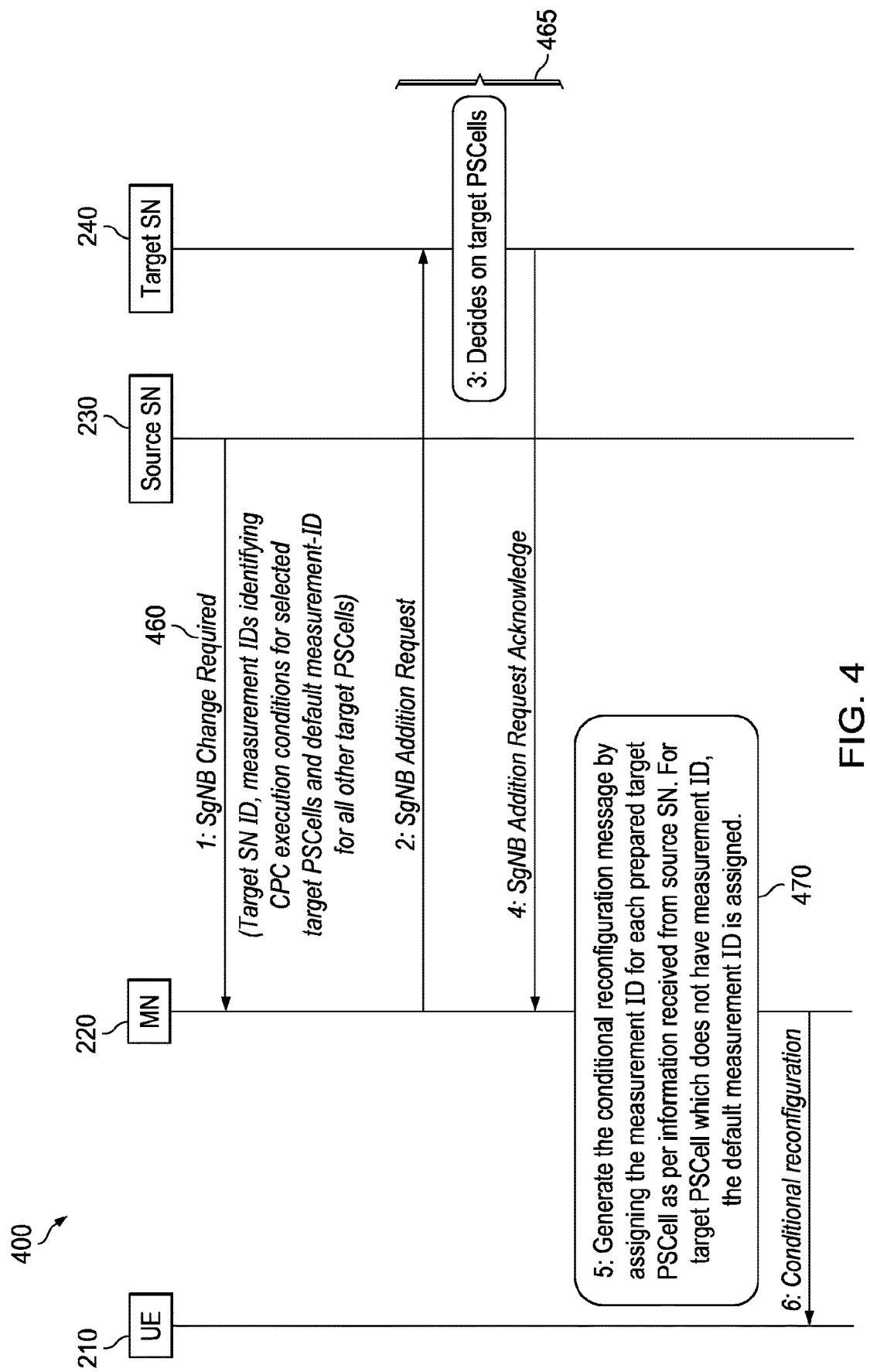
FIG. 4 is an illustration of a diagram of an example signal flow for SgNB Change Required message with CPC execution conditions for selected target PSCells and a default CPC execution condition for other target PSCells.

FIG. 4 is an illustration of a diagram of an example signal flow 400 for SgNB Change Required message with CPC execution conditions for selected target PSCells and a default CPC execution condition for other target PSCells. Signal flow 400 uses the same operators as described in signal flow 200 of FIG. 2 with differing messaging to demonstrate additional aspects of the disclosure to generate the conditional reconfiguration message.

In a signal step 460, the SN/SgNB Change Required message initiates the process. The SN/SgNB Change Required message includes a list of the execution conditions for the selected target PSCells along with a default execution condition, i.e., a measurement ID, for potential target PSCells not included in the list. 3GPP standard steps 465 are executed as per the standards. In a signal step 470, MN 220 generates the final conditional reconfiguration message and links the execution condition, e.g., the measurement IDs, with the accepted target PSCells. If a target PSCell is selected by target SN 240 that does not have a dedicated measurement ID, MN 220 assigns a default measurement ID for that candidate target PSCell. The conditional reconfiguration message is communicated to UE 210 using 3GPP standard step 6.

Figure 5:
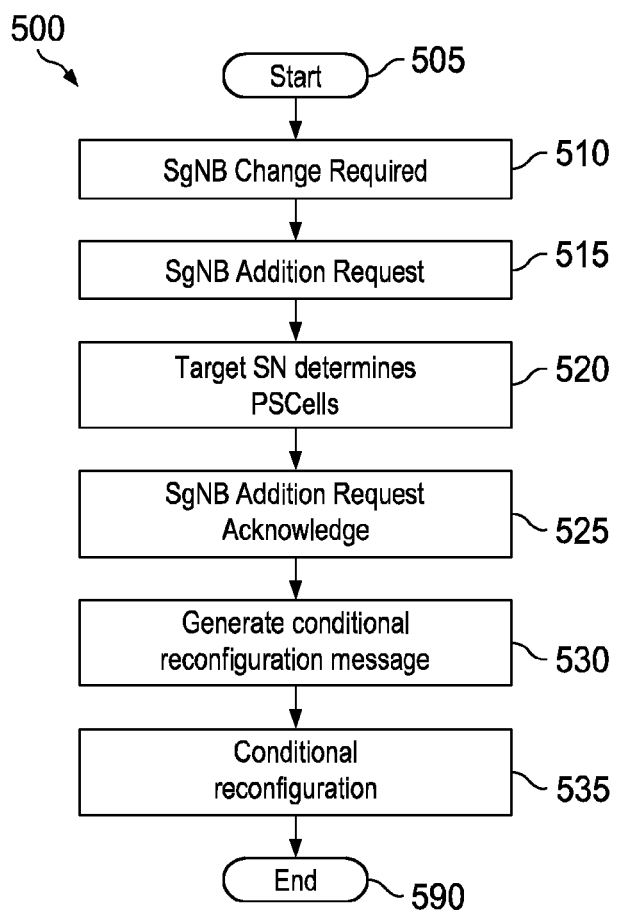
FIG. 5 is an illustration of a flow diagram of an example method to perform a SgNB Change Required operation.

FIG. 5 is an illustration of a flow diagram of an example method 500 to perform a SgNB Change Required operation. Method 500 can be implemented on a set of network devices and nodes, such as a MN, a source SN, a target SN, and a UE.

Method 500 starts at a step 505 and proceeds to a step 510. In some aspects, a step 510 can have the source SN initiating the process and providing the MN with the common measurement ID, i.e., CPC execution condition, for one or more prepared target PSCells, using a SN/SgNB Change Required message. In some aspects, step 510 can have the source SN initiating the process and providing the MN with the SN/SgNB Change Required message including a list of the execution conditions for the selected target PSCells along with a default execution condition, i.e., a measurement ID, for other target PSCells not included in the list.

In a step 515, the MN can communicate the SN/SgNB Addition Request message to the target SN per 3GPP standards. In a step 520, the target SN determines a list of target PSCells per 3GPP standards. In a step 525, the target SN communicates, e.g., transmits or sends, to the MN the SN/SgNB Addition Request Acknowledge message per 3GPP standards.

In some aspects, in a step 530, the MN generates the conditional reconfiguration message by assigning the same measurement ID to the prepared target PSCells of the same target SN. In some aspects, in step 530, the MN can generate the conditional reconfiguration message by assigning a measurement ID from a set of measurement IDs for each prepared target PSCell as per the information received from the source SN. For a target PSCell that does not have a measurement ID, the default measurement ID is assigned.

In a step 535, the MN communicates the conditional reconfiguration message, containing the cell change parameters, to the UE per 3GPP standards. Method 500 ends at a step 590.

Figure 6:
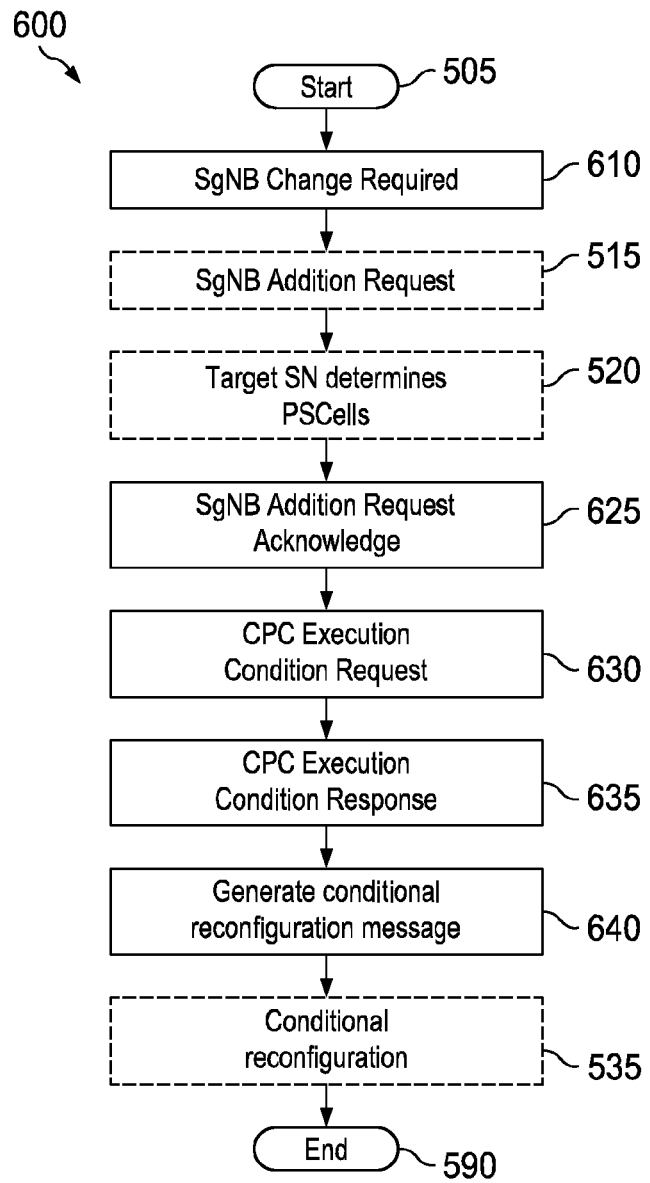
FIG. 6 is an illustration of a flow diagram of an example method, building on FIG. 5, to provide additional messages.

FIG. 6 is an illustration of a flow diagram of an example method 600, building on FIG. 5, to provide additional messages. Method 600 starts at step 505 and proceeds to a step 610, where the source SN initiates the process and provides the MN with indication to inform back the source SN about the one or more target PSCells that will be selected and determined by the target SN, including a target SN ID. In some aspects, step 610 can have the source SN initiating the process and providing the MN with a set of target PSCells that can be selected and prepared by target SN.

Step 515 and step 520 follow as described in method 500 of FIG. 5. Method 600 proceeds to a step 625 where the target SN responds with a list, e.g., set, of prepared target PSCells that were determined at the target SN. In a step 630, the MN can inform the source SN which target PSCells have been selected and prepared by the target SN using a CPC Execution Condition Request message. In a step 635, the source SN adds one or more CPC execution conditions, for example, measurement IDs, to the target PSCells that have been prepared by target SN and communicates the CPC execution conditions back to the MN using a CPC Execution Condition Response message. In a step 640, the MN generates the conditional reconfiguration message, containing the cell change parameters, by assigning a dedicated, e.g., single, measurement ID to each prepared target PSCell of the same target SN. Method 600 proceeds to step 535 and ends at step 590.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RANI devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method, comprising:
    initiating a secondary node/secondary 5G base station change required message with a source secondary node, wherein the secondary node/secondary 5G base station change required message includes a target secondary node identification;
    communicating a secondary node/secondary 5G base station addition request message from a master node as a response to the secondary node/secondary 5G base station change required message received from the source secondary node;
    transmitting a secondary node/secondary 5G base station addition request acknowledge message from a target secondary node as a response to the secondary node/secondary 5G base station addition request message received from the master node, wherein the target secondary node determines one or more prepared target primary secondary cells, and wherein the secondary node/secondary 5G base station addition request acknowledge message includes a list of prepared target primary secondary cells determined with the target secondary node;
    sending, from the master node to the source secondary node, a request related to conditional primary secondary cell change execution condition in response to the secondary node/secondary 5G base station addition request acknowledge message, wherein the request related to conditional primary secondary cell change execution condition includes the list of prepared target primary secondary cells;
    receiving at the master node a message in response to the request related to conditional primary secondary cell change execution condition, wherein the message includes one or more conditional primary secondary cell change execution conditions corresponding to one or more target primary secondary cells in the list of prepared target primary secondary cells; and
    generating a conditional reconfiguration message at the master node and communicating the conditional reconfiguration message to a user equipment, wherein the master node utilizes the secondary node/secondary 5G base station addition request acknowledge message received from the target secondary node and the one or more conditional primary secondary cell change execution conditions received from the source secondary node.

2. The method as recited in claim 1, wherein the secondary node/secondary 5G base station change required message includes an indication for the master node to inform to the source secondary node the target primary secondary cells that are selected and prepared with the target secondary node.

3. The method as recited in claim 1, wherein the secondary node/secondary 5G base station change required message includes a list of target primary secondary cells that are suggested to be prepared with the target secondary node.

4. The method as recited in claim 3, wherein the list of prepared target primary secondary cells is a subset of the list of target primary secondary cells that are suggested, with the source secondary node, to be prepared.

5. A system, comprising:
    a user equipment configured to transceive communications with one or more communication nodes, wherein the user equipment supports conditional cell change operations and receives a conditional reconfiguration message;
    a master node configured to transceive communications with the user equipment;
    a source secondary node configured to transceive communications with the master node; and
    a target secondary node configured to transceive communications with the master node and the source secondary node, wherein the source secondary node is configured to communicate a secondary node/secondary 5G base station change required message to the master node to initiate conditional primary secondary cell change process;
    wherein the master node is configured to communicate a secondary node/secondary 5G base station addition request message to the target secondary node;
    wherein the target secondary node is configured to communicate a secondary node/secondary 5G base station addition request acknowledge message to the master node, wherein the secondary node/secondary 5G base station addition request acknowledge message includes a list of prepared target primary secondary cells;
    wherein the master node is further configured to communicate a request related to conditional primary secondary cell change execution condition to the source secondary node, wherein the request includes the list of prepared target primary secondary cells corresponding to one or more respective target secondary nodes;
    wherein the source secondary node is further configured to communicate a message in response to the request related to conditional primary secondary cell change execution condition, wherein the message includes one or more conditional primary secondary cell change execution conditions corresponding to one or more target primary secondary cells in the list of prepared target primary secondary cells.

6. The system as recited in claim 5, wherein the master node is one of a first 5G base station, gNB, a first enhanced Node B, eNB, a first enhanced gNB, en-gNB, or a first next generation eNB, ng-eNB, the source secondary node is one of a second gNB, a second eNB, a second en-gNB, or a second ng-eNB, and the target secondary node is one of a third gNB, a third eNB, a third en-gNB, or a third ng-eNB.

7. The system as recited in claim 5, wherein the conditional reconfiguration message is generated at the master node utilizing the one or more conditional primary secondary cell change execution conditions and the list of prepared target primary secondary cells.

8. A method, implemented with a master node, for configuring a conditional cell change operation at a user equipment for a master node, a source secondary node, and a target secondary node, where the master node is one of a first 5G base station, gNB, a first enhanced Node B, eNB, a first enhanced gNB, en-gNB, or a first next generation eNB, ng-eNB, the source secondary node is one of a second gNB, a second eNB, a second en-gNB, or a second ng-eNB, and the target secondary node is one of a third gNB, a third eNB, a third en-gNB, or a third ng-eNB, comprising:

receiving a secondary node/secondary 5G base station change required message sent from the source secondary node;

communicating an addition request message and an addition request acknowledge message as response to receiving the secondary node/secondary 5G base station change required message sent from the source secondary node, wherein the addition request acknowledge message includes a list of prepared target primary secondary cells;

sending a request related to conditional primary secondary cell change execution condition to the source secondary node in response to the secondary node/secondary 5G base station addition request acknowledge message, wherein the request related to conditional primary secondary cell change execution condition includes the list of prepared target primary secondary cells; and receiving a message from the source secondary node in response to the request related to conditional primary secondary cell change execution condition, wherein the message includes one or more conditional primary secondary cell change execution conditions corresponding to one or more target primary secondary cells in the list of prepared target primary secondary cells;

generating a conditional reconfiguration message based on the list of prepared target primary secondary cells and the one or more conditional primary secondary cell change execution conditions; and transmitting the conditional reconfiguration message to the user equipment.

\* \* \* \* \*